(12) United States Patent
Le et al.

(10) Patent No.: US 10,879,731 B2
(45) Date of Patent: Dec. 29, 2020

(54) FERRORESONANT TRANSFORMER SYSTEMS AND METHODS WITH SELECTABLE INPUT AND OUTPUT VOLTAGES FOR USE IN UNINTERRUPTIBLE POWER SUPPLIES

(71) Applicant: ALPHA TECHNOLOGIES SERVICES, INC., Bellingham, WA (US)

(72) Inventors: Thanh Quoc Le, Ferndale, WA (US); Pankaj H. Bhatt, Bellingham, WA (US); Thomas Patrick Newberry, Blaine, WA (US)

(73) Assignee: ALPHA TECHNOLOGIES SERVICES, INC., Bellingham, WA (US)

( * ) Notice: Subject to any disclaimer, the term of this patent is extended or adjusted under 35 U.S.C. 154(b) by 0 days.

(21) Appl. No.: 16/539,286

(22) Filed: Aug. 13, 2019

(65) Prior Publication Data

US 2019/0363573 A1 Nov. 28, 2019

Related U.S. Application Data

(63) Continuation of application No. 15/294,571, filed on Oct. 14, 2016, now Pat. No. 10,381,867.

(60) Provisional application No. 62/242,862, filed on Oct. 16, 2015.

(51) Int. Cl.
*H02J 9/00* (2006.01)
*H02J 9/06* (2006.01)
*H02M 7/44* (2006.01)
*H02M 5/12* (2006.01)
*H02M 1/10* (2006.01)

(52) U.S. Cl.
CPC ............... *H02J 9/061* (2013.01); *H02J 9/00* (2013.01); *H02M 1/10* (2013.01); *H02M 5/12* (2013.01); *H02M 7/44* (2013.01)

(58) Field of Classification Search
CPC .. H02J 9/00; H02M 1/00; H02M 5/00; H02M 7/00
See application file for complete search history.

(56) References Cited

U.S. PATENT DOCUMENTS 3,916,295 A * 10/1975 Hunter ..................... G05F 1/38
323/248
4,262,245 A *  4/1981 Wendt ..................... G05F 3/06
323/308
5,198,970 A *  3/1993 Kawabata ............... H02J 9/062
363/37

(Continued)

*Primary Examiner* — Rexford N Barnie
*Assistant Examiner* — Joseph N Inge
(74) *Attorney, Agent, or Firm* — Michael R. Schacht; Schacht Law Office, Inc.

(57) ABSTRACT

A ferroresonant transformer system has a core, a shunt, first and second input windings, an inverter winding, a tank winding, a resonant capacitor, an output capacitor, and a plurality of switches. The tank winding defines a plurality of switch tap locations and at least two output tap locations. The resonant capacitor is connected across at least a portion of the tank winding. Each switch is operatively connectable between one of the switch tap locations and the resonant capacitor. Each output terminal is operatively connected to one of the at least two output tap locations.

10 Claims, 4 Drawing Sheets

(56) References Cited

U.S. PATENT DOCUMENTS

| | | | | |
|---|---|---|---|---|
| 6,218,744 B1* | 4/2001 | Zahrte, Sr. | ............... | G05F 1/14 |
| | | | | 307/64 |
| 6,348,782 B1* | 2/2002 | Oughton, Jr. | ........... | H02J 9/062 |
| | | | | 323/284 |
| 2009/0097280 A1* | 4/2009 | Wu | ..................... | H02M 3/3378 |
| | | | | 363/17 |
| 2011/0198932 A1* | 8/2011 | Le | ........................... | H02J 9/062 |
| | | | | 307/66 |
| 2012/0091811 A1* | 4/2012 | Heidenreich | ........... | H02J 9/062 |
| | | | | 307/65 |
| 2012/0112547 A1* | 5/2012 | Ghosh | .................... | H02J 9/062 |
| | | | | 307/66 |
| 2012/0217808 A1* | 8/2012 | Richardson | ............. | H02M 1/10 |
| | | | | 307/64 |
| 2017/0229906 A1* | 8/2017 | Le | ........................... | H02J 9/062 |

* cited by examiner

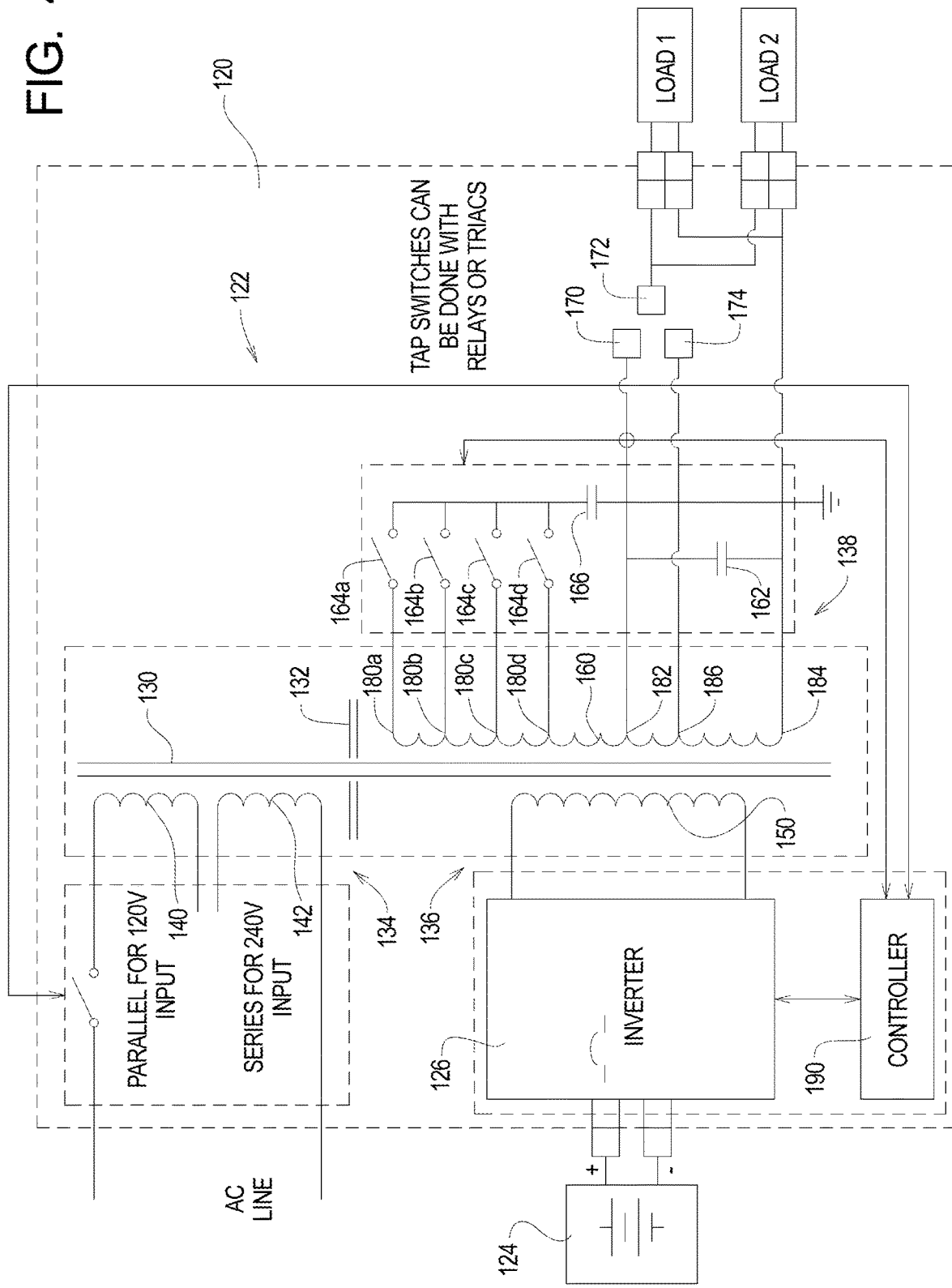

FERRORESONANT TRANSFORMER SYSTEMS AND METHODS WITH SELECTABLE INPUT AND OUTPUT VOLTAGES FOR USE IN UNINTERRUPTIBLE POWER SUPPLIES

RELATED APPLICATIONS

This application is a continuation of U.S. patent application Ser. No. 15/294,571 filed Oct. 14, 2016.

U.S. patent application Ser. No. 15/294,571 claims priority of U.S. Provisional Application Ser. No. 62/242,862, filed on Oct. 16, 2015.

The contents of all related applications are incorporated herein by reference.

TECHNICAL FIELD

The present invention relates to ferroresonant transformers systems and, in particular, ferroresonant transformers systems for use in uninterruptible power supplies that are capable of accommodating different input and output voltages.

BACKGROUND

Uninterruptible power supplies are ideally capable of operating in operating environments having differing utility voltage standards. The need exists for improved uninterruptible power supplies, and ferroresonant transformer systems for use in such improved uninterruptible power supplies, capable of being easily and quickly field-modified to operate using different utility voltage standards.

SUMMARY

The present invention may be embodied as a ferroresonant transformer comprising a core, a shunt, at least one input winding, an inverter winding, a tank winding, a resonant capacitor, and an output capacitor, and a plurality of switches, and at least two output terminals. The tank winding defines a plurality of switch tap locations and at least two output tap locations. The resonant capacitor is connected across at least a portion of the tank winding. Each switch is operatively connectable between one of the switch tap locations and the resonant capacitor. To regulate an output voltage across the output terminals, a selected switch of the plurality of switches is closed while any non-selected switch of the plurality of switches is open such that the output capacitor is operatively connected to a desired switch tap location of the plurality of switch tap locations.

The present invention may also be embodied as operatively connecting a source of utility power, a battery system, and an inverter, the method comprising the following steps. A ferroresonant transformer is provided. The ferroresonant transformer comprises a core, a shunt, at least one input winding, an inverter winding, a tank winding defining a plurality of switch tap locations and at least two output tap locations. A resonant capacitor is connected across at least a portion of the tank winding. A plurality of switches is provided, where each switch is operatively connectable between one of the switch tap locations and the resonant capacitor. At least two output terminals are provided, where each output terminal is operatively connected to one of the at least two output tap locations. An output voltage across the output terminals is regulated such that the output capacitor is operatively connected to a desired switch tap location of the plurality of switch tap locations by closing a selected switch of the plurality of switches and opening any non-selected switch of the plurality of switches.

BRIEF DESCRIPTION OF THE DRAWINGS

FIG. 4 is a block diagram of a first example uninterruptible power supply incorporating the first example ferroresonant transformer of FIG. 1.

DETAILED DESCRIPTION

Figure 1:
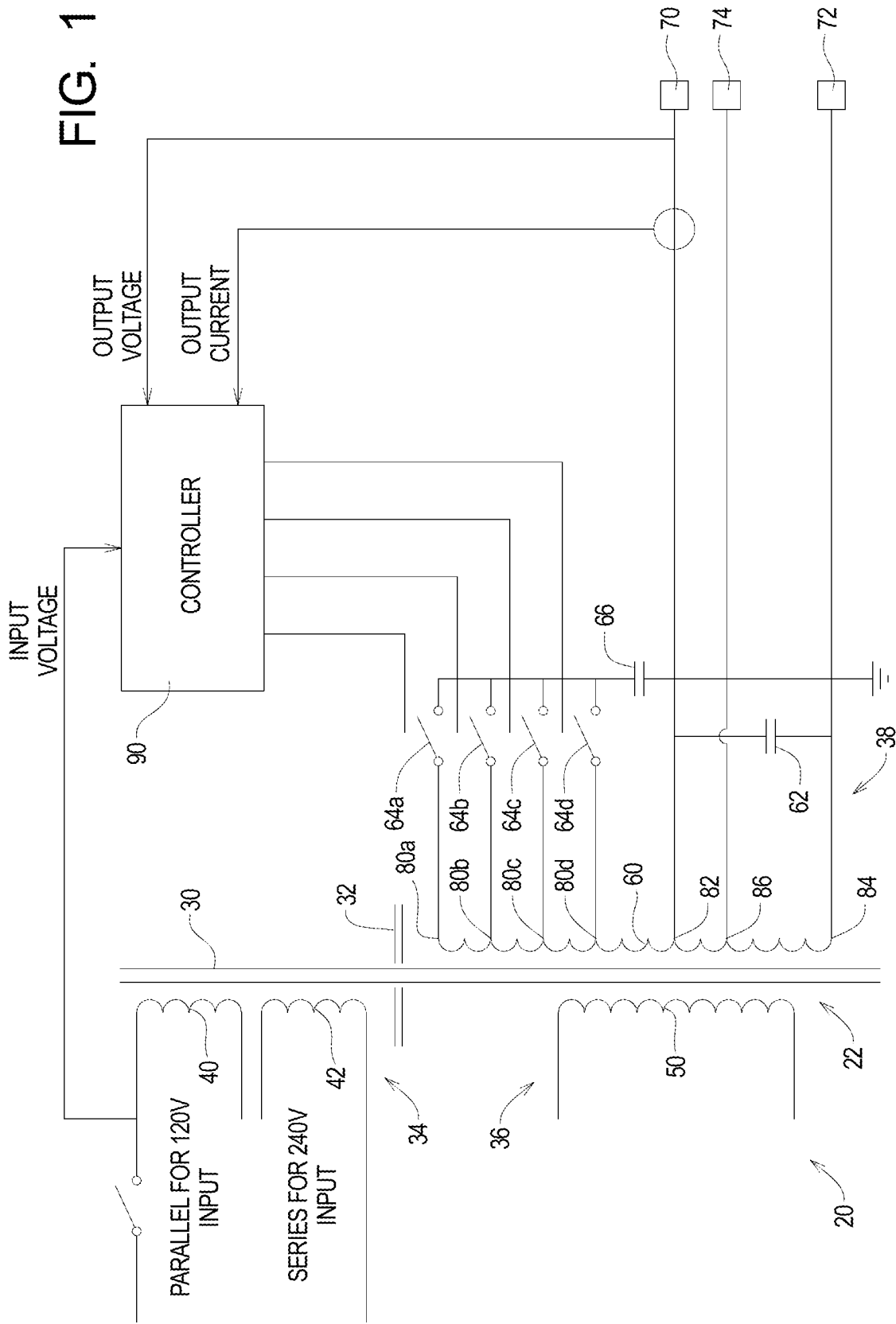
FIG. 1 depicts a first example ferroresonant transformer of the present invention adapted for use as part of an uninterruptible power supply.

Referring to FIG. 1 of the drawing, depicted therein is a first example ferroresonant transformer system 20 of the present invention. The first example ferroresonant transformer system 20 comprises a ferroresonant transformer 22 comprising a core 30 and a shunt 32. In the following discussion, certain reference characters will be used herein to refer to both a type of element and a specific one of that type of element. Letters will be appended to such reference characters when the reference character refers to a specific element.

In the first example ferroresonant transformer system 20, the shunt 32 is arranged relative to the core 30 to define a primary side comprising an input section 34 and a secondary side comprising an inverter section 36 and an output section 38 of the ferroresonant transformer 22. The input section 34 comprises first and second input windings 40 and 42. The inverter section comprises 36 comprises an inverter winding 50. The output section 38 comprises a tank winding 60, an output capacitor 62, a plurality of switches 64, a resonant capacitor 66, and output terminals 70 and 72. Optionally, an alternative output terminal 74 may be used.

The switches 64 are each operably connectable between one of a plurality of switch tap locations 80 of the tank winding 60 and the resonant capacitor 66. The output terminals 70 and 72 are connected to output tap locations 82 and 84 of the tank winding 60. Optionally, an alternative output tap 86 may be used.

The example output section 38 comprises four switches 64a, 64b, 64c, and 64d and four switch tap locations 80a, 80b, 80c, and 80d, although more or fewer switches 64 and switch tap locations 80 may be used. Typically, a plurality (two or more) of the switches 64 are used to implement tap switching. The example switches 64 can be triacs or mechanical relays.

A controller 90 is configured to control the switches 64. In general, the example controller 90 controls the switches 64 based on an output voltage, an output current, and an input voltage as will be described in further detail below.

Figure 2:
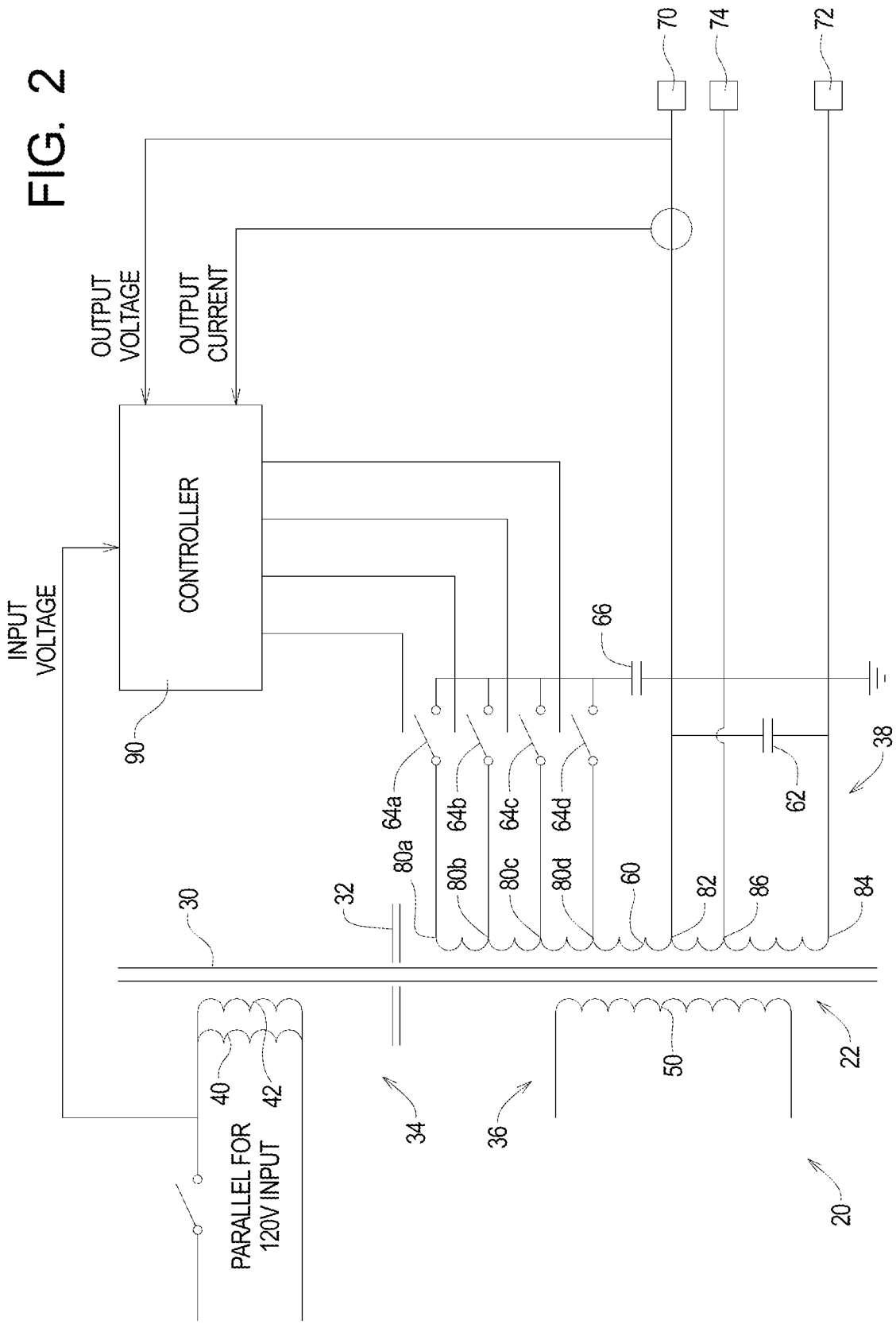
FIG. 2 depicts the first example ferroresonant transformer in a first configuration.
Figure 3:
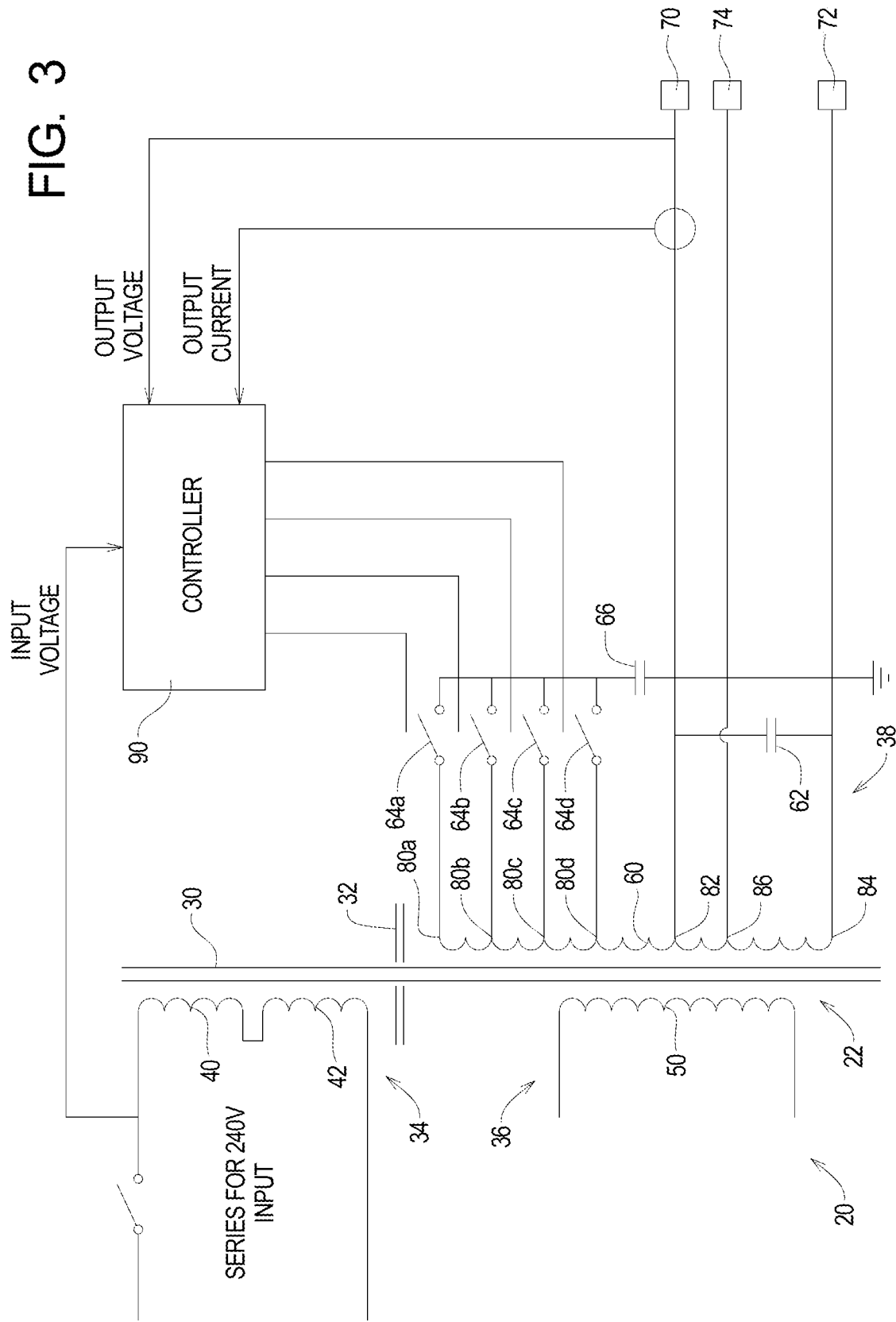
FIG. 3 depicts the first example ferroresonant transformer in a second configuration.

In the first example ferroresonant transformer system 20 the first and second input windings 40 and 42 are connected in parallel for 120V input voltage and in series for 240V input voltage. As shown in FIG. 2, the first and second input windings 40 and 42 are connected in parallel to accommodate a 120V input. FIG. 3 shows that first and second input windings 40 and 42 are connected in series to accommodate a 240V input. The switch between parallel and series connection can be implemented such that the selection between 120V and 240V can easily be made in the field.

In particular, the example controller 90 operates the switches 64a, 64b, 64c, and 64d based on based on the output voltage, the output current, and the input voltage to optimize the operation of the transformer system 20 for a given set of operating conditions. The use of the switches 64a, 64b, 64c, and 64d to control the one of the taps 80a, 80b, 80c, and 80d to which the resonant capacitor 66 is connected allows a size of the ferroresonant transformer 22 to be kept to a minimum. The example controller 90 is configured such that the switches 64a, 64b, 64c, and 64d are configured to open and close when the AC current signal is at or near a zero crossing point and such that only one of the switches 64a, 64b, 64c, and 64d is effectively closed at any given point in time.

The first example ferroresonant transformer system 20 of the present invention thus implements tap switching on the ferro tank winding 60 of the output section 38 thereof. The first example ferroresonant transformer 20 thus implements tap switching at the output section 38 (e.g., the tank winding 60) instead of the input section 34.

FIG. 4 illustrates a first example uninterruptible power supply 120 incorporating a second example ferroresonant transformer system 122, a battery system 124, and an inverter 126.

The example ferroresonant transformer 122 forming part of the first example uninterruptible power supply 120 comprises a core 130 and a shunt 132. The example shunt 132 is arranged relative to the core 130 to define a primary side comprising an input section 134 and a secondary side comprising an inverter section 136 and an output section 138 of the ferroresonant transformer 122. The input section 134 comprises first and second input windings 140 and 142. The inverter section comprises 136 comprises an inverter winding 150. The output section 138 comprises a tank winding 160, an output capacitor 162, a plurality of switches 164, a resonant capacitor 166, and output terminals 170 and 172. Optionally, an alternative output terminal 174 may be used.

The switches 164 are each operably connectable between one of a plurality of switch tap locations 180 of the tank winding 160 and the resonant capacitor 166. The output terminals 170 and 172 are connected to output tap locations 182 and 184 of the tank winding 160. Optionally, an alternative output tap 186 may be used.

The example output section 138 comprises four switches 164a, 164b, 164c, and 164d and four switch tap locations 180a, 180b, 180c, and 180d, although more or fewer switches 164 and switch tap locations 180 may be used. Typically, a plurality (two or more) of the switches 164 are used to implement tap switching. The example switches 164 can be triacs or mechanical relays.

A controller 190 is configured to control the switches 164. In general, the example controller 190 controls the switches 164 based on an output voltage, an output current, and an input voltage as will be described in further detail below.

The first and second input windings 140 and 142 are connected in parallel for 120V input voltage (see, e.g., FIG. 2) and in series for 240V input voltage (see, e.g., FIG. 3). The switch between parallel and series connection can be implemented such that the selection between 120V and 240V can easily be made in the field.

In particular, the example controller 190 operates the switches 164a, 164b, 164c, and 164d based on based on the output voltage, the output current, and the input voltage to optimize the operation of the transformer system 122 for a given set of operating conditions. The use of the switches 164a, 164b, 164c, and 164d to control the one of the taps 180a, 180b, 180c, and 180d to which the resonant capacitor 166 is connected allows a size of the ferroresonant transformer 122 to be kept to a minimum. The example controller 190 is configured such that the switches 164a, 164b, 164c, and 164d are configured to open and close when the AC current signal is at or near a zero crossing point and such that only one of the switches 164a, 164b, 164c, and 164d is effectively closed at any given point in time.

The example uninterruptible power supply 120 normally operates in a line mode in which the example uninterruptible power supply 120 supplies power based on a line voltage present across one or both of the windings 140 and 142. The example inverter 126 is connected between the battery 124 and the inverter winding 150 to provide a source of DC power when the example uninterruptible power supply 120 is operating in a standby mode.

The first example uninterruptible power supply 120 incorporating a second example ferroresonant transformer system 122 thus implements tap switching on the ferro tank winding 160 of the output section 138 thereof. The second example ferroresonant transformer 122 thus implements tap switching at the output section 138 (e.g., the tank winding 160) instead of the input section 134.

By implementing tap switching at the output section (e.g., the tank winding 60 or 160 of output section 38 or 138) instead of the input section (e.g., 34 or 134), the first example ferroresonant transformer 20 and the first example uninterruptible power supply 120 comprising the second example ferroresonant transformer 122 provide the following benefits:

1. Simple dual input voltage windings configuration;
2. Ease of designing triac for tap switching devices with the high ferro inductance between input and output preventing huge utility current during tap switching;
3. High voltage tank winding allow the use of triac without losing efficiency due to high conduction loss between triac versus relay;
4. Cost reduction with low cost triac versus high cost relay; and
5. Improving the reliability with semiconductor triac versus mechanical relays.

The present invention may be implemented in forms other than those specifically described above, and the scope of the invention should be determined by the claims appended hereto and not the foregoing detailed descriptions of examples of the present invention.

What is claimed is:

1. A ferroresonant transformer system for operatively connecting a source of utility power, a battery system, and an inverter, the ferroresonant transformer comprising:
   a core;
   a shunt;
   at least one input winding;
   an inverter winding;
   a tank winding defining a plurality of switch tap locations and at least two output tap locations;
   a resonant capacitor connected across at least a portion of the tank winding; and
   an output capacitor;
   a plurality of switches, where each switch is operatively connectable between one of the switch tap locations and the resonant capacitor; and
   at least two output terminals, where each output terminal is operatively connected to one of the at least two output tap locations; wherein
   to regulate an output voltage across the output terminals, a selected switch of the plurality of switches is closed while any non-selected switch of the plurality of switches is open such that the output capacitor is operatively connected to a desired switch tap location of the plurality of switch tap locations.

2. A ferroresonant transformer system as recited in claim 1, in which the at least one input winding comprises first and second input windings connected in series.

3. A ferroresonant transformer system as recited in claim 1, in which the at least one input winding comprises first and second input windings connected in parallel.

4. A ferroresonant transformer system as recited in claim 1, further comprising a controller for controlling the plurality of switches based on at least one of an output voltage, an output current, and an input voltage.

5. A ferroresonant transformer system as recited in claim 1, further comprising a controller for controlling the plurality of switches based on an output voltage, an output current, and an input voltage.

6. A method of operatively connecting a source of utility power, a battery system, and an inverter, the method comprising the steps of:
   providing a ferroresonant transformer comprising
      a core;
      a shunt;
      at least one input winding;
      an inverter winding;
      a tank winding defining a plurality of switch tap locations and at least two output tap locations;
      a resonant capacitor connected across at least a portion of the tank winding; and
      an output capacitor;
   a plurality of switches, where each switch is operatively connectable between one of the switch tap locations and the resonant capacitor; and
   at least two output terminals, where each output terminal is operatively connected to one of the at least two output tap locations; wherein
   regulating an output voltage across the output terminals such that the output capacitor is operatively connected to a desired switch tap location of the plurality of switch tap locations by
   closing a selected switch of the plurality of switches, and opening any non-selected switch of the plurality of switches.

7. A method as recited in claim 6, in which the step of providing at least one input winding comprises the step of connecting first and second input windings in series.

8. A method as recited in claim 6, in which the step of providing at least one input winding comprises the step of connecting first and second input windings in parallel.

9. A method as recited in claim 6, further comprising the step of controlling the plurality of switches based on at least one of an output voltage, an output current, and an input voltage.

10. A method as recited in claim 6, further comprising the step of controlling the plurality of switches based on an output voltage, an output current, and an input voltage.

* * * * *